United States Patent
Jimenez

(10) Patent No.: US 10,100,879 B2
(45) Date of Patent: Oct. 16, 2018

(54) DRIVE ASSEMBLY INCLUDING A DAMPER AND CLUTCH PLATE SUBASSEMBLY AND METHOD OF FORMING DRIVE ASSEMBLIES

(71) Applicant: Schaeffler Technologies AG & Co. KG, Herzogenaurach (DE)

(72) Inventor: Alfredo Jimenez, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 226 days.

(21) Appl. No.: 15/091,308

(22) Filed: Apr. 5, 2016

(65) Prior Publication Data

US 2017/0284478 A1 Oct. 5, 2017

(51) Int. Cl.
*F16D 13/68* (2006.01)
*F16D 13/40* (2006.01)
*F16D 13/64* (2006.01)

(52) U.S. Cl.
CPC ............. *F16D 13/68* (2013.01); *F16D 13/40* (2013.01); *F16D 13/644* (2013.01); *F16D 2250/0061* (2013.01); *F16D 2300/22* (2013.01)

(58) Field of Classification Search
CPC .. F16D 13/64; F16D 13/68; F16D 2250/0084; F16D 13/644; F16D 2250/0061
See application file for complete search history.

(56) References Cited

U.S. PATENT DOCUMENTS

| | | | | |
|---|---|---|---|---|
| 2,571,291 A * | 10/1951 | Reed | ............... | F16D 13/644 |
| | | | | 192/212 |
| 3,095,716 A * | 7/1963 | Smirl | ............... | F16D 13/68 |
| | | | | 192/109 R |
| 5,355,984 A * | 10/1994 | Grabis | ............... | F16D 13/385 |
| | | | | 192/213.12 |
| 7,568,569 B2 * | 8/2009 | Lamana | ............... | F16D 13/644 |
| | | | | 192/214.1 |
| 2016/0076600 A1 | 3/2016 | Patino Crespo et al. | | |

* cited by examiner

*Primary Examiner* — Ramya P Burgess
*Assistant Examiner* — Lillian T Nguyen
(74) *Attorney, Agent, or Firm* — Davidson, Davidson & Kappel, LLC

(57) ABSTRACT

A drive assembly for a motor vehicle clutch is provided. The drive assembly includes a subassembly includes at least one clutch facing and at least one support segment supporting the at least one clutch facing, the at least one support segment including an outer radial portion fixed to the at least one clutch facing and an inner radial portion extending radially inward from the outer radial portion; an extender connected to the inner radial portion of the at least one support segment; and a cover plate, the extender connecting the subassembly to the cover plate. A method of forming a drive assembly and a method of forming a plurality of drive assemblies are also provided.

20 Claims, 5 Drawing Sheets

DRIVE ASSEMBLY INCLUDING A DAMPER AND CLUTCH PLATE SUBASSEMBLY AND METHOD OF FORMING DRIVE ASSEMBLIES

The present disclosure relates generally to clutches and more specifically to drive assemblies including dampers and clutch plates.

BACKGROUND

Conventionally, a subassembly is formed including clutch facings, support segments for the clutch facings and a retainer plate for the support segments. Once assembled, a damper is fixed piece-by-piece onto the retainer plate.

SUMMARY OF THE INVENTION

A drive assembly for a motor vehicle clutch is provided. The drive assembly includes a subassembly includes at least one clutch facing and at least one support segment supporting the at least one clutch facing, the at least one support segment including an outer radial portion fixed to the at least one clutch facing and an inner radial portion extending radially inward from the outer radial portion; an extender connected to the inner radial portion of the at least one support segment; and a cover plate, the extender connecting the subassembly to the cover plate.

A method for forming a drive assembly for a motor vehicle clutch is also provided. The method includes fixing a plurality of support segments to at least one clutch facing; fixing radially inner portions of the support segments to an extender; and fixing the extender to a damper cover plate.

A method of forming a plurality of drive assemblies is also provided. The method includes providing a set of subassemblies of a same design, each of the subassemblies including at least one clutch facing and at least one support segment supporting the at least one clutch facing, the at least one support segment including an outer radial portion fixed to the at least one clutch facing and an inner radial portion extending radially inward from the outer radial portion; fixing each subassembly of a first subset of the subassemblies to one of plurality of first cover plates, each of the subassemblies of the first subset being fixed to the respective first cover plate via a respective extender; and fixing each subassembly of a second subset of the subassemblies to one of plurality of second cover plates, the second cover plates having a design different than the first cover plates.

BRIEF DESCRIPTION OF THE DRAWINGS

The present invention is described below by reference to the following drawings, in which:

FIG. 1b shows a perspective view of a drive assembly including the components shown in FIG. 1a;

FIG. 3b shows a cross-sectional side view of the drive assembly shown in FIG. 3a;

DETAILED DESCRIPTION

The present disclosure provides an extension ring to adapt segments and facings of a clutch disc to various aftermarket applications. The extension ring includes holes for various applications to avoid redeveloping new segments.

Figure 1A:
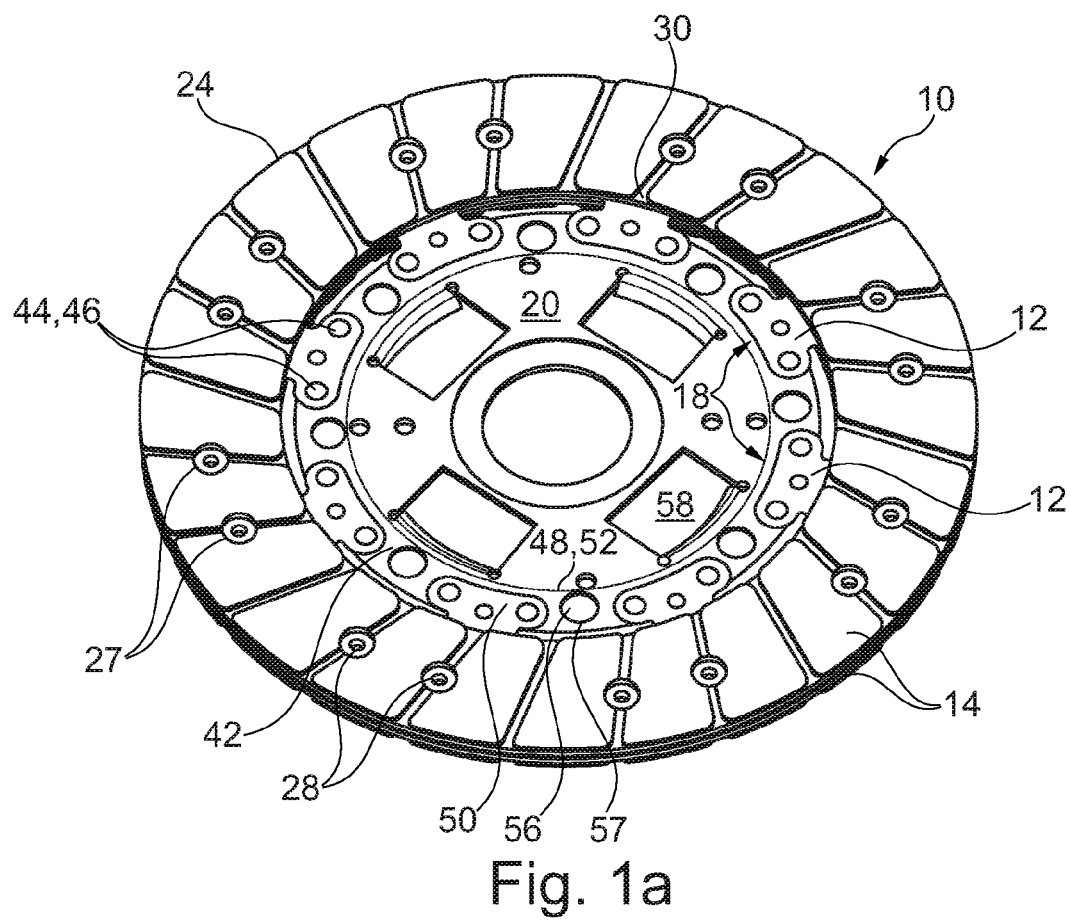
FIG. 1a shows a perspective view of a clutch subassembly fixed to a damper assembly cover plate via an extension ring in accordance with an embodiment of the present invention.
Figure 1C:
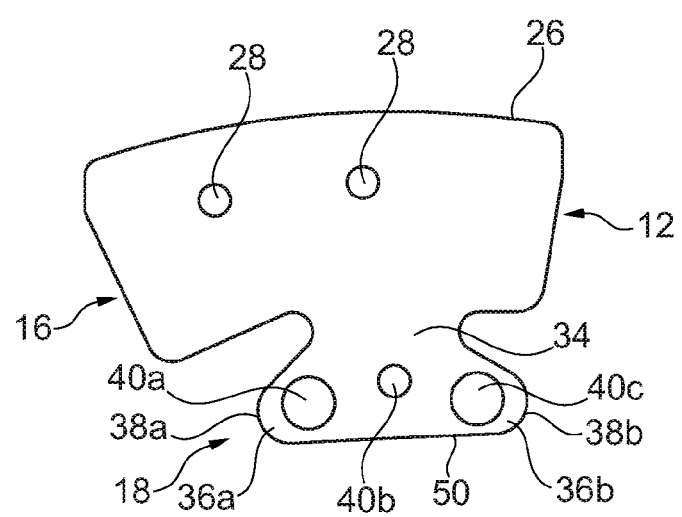
FIG. 1c shows enlarged view of a support segment of the clutch subassembly shown in FIGS. 1a, 1b.
Figure 1B:
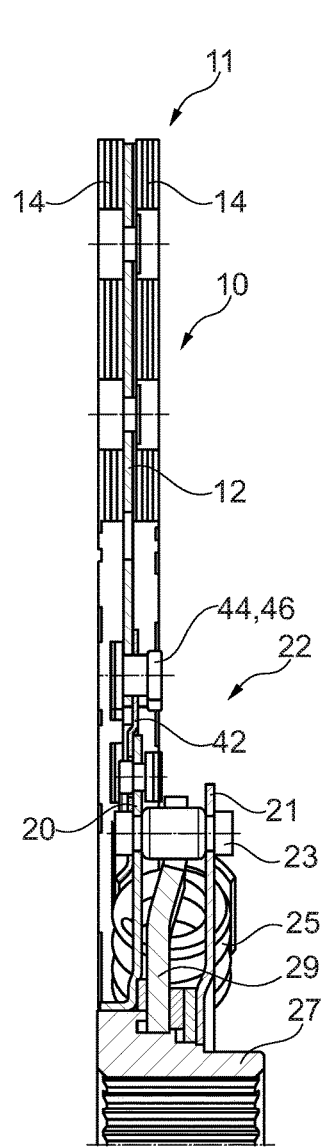

FIG. 1a shows a perspective view of a clutch subassembly 10 fixed to a damper assembly cover plate 20 in accordance with an embodiment of the present invention. FIG. 1b shows a cross-sectional side view of a drive assembly 11 including clutch subassembly 10 fixed to damper assembly cover plate 20 of a damper assembly 22 in accordance with an embodiment of the present invention. Clutch subassembly 10 includes a plurality of support segments 12 supporting at least one clutch facing 14. In the embodiment shown in FIG. 1a, support segments 12 are provided with two clutch facings 14, on opposing axial surfaces of support segments 12. An enlarged view of one of support segments 12 is shown in FIG. 1c. In this embodiment, support segments 12 support two clutch facings 14, one on a first axial surface thereof (i.e., the top surface) and one on a second axial surface thereof opposite the first axial surface (i.e., the bottom surface), such that segments 12 are each axially sandwiched between the facings 14. As is conventional, clutch facings 14 are formed of friction material, such as friction paper.

Support segments 12 each include a radially outer portion 16 fixed to clutch facings 14 and a radially inner portion 18, i.e., a formed foot, for connection to first cover plate 20 of a damper 22, as discussed in further detail below. In this embodiment, an outer circumferential surface 24 of clutch facings 14 is radially outside of an outer radial surface 26 of each support segment 12. Radially outer portions 16 are fixed to facings 14 by fasteners 28 that pass through facings 14 and the respective support segment 12 and contact outer axial surfaces of facings 14. In a preferred embodiment, fasteners 28 are rivets.

Radially inner portions 18 extend radially inside of an inner circumferential surface 30 of clutch facings 14. Radially inner portion 18 of each segment 12 includes a base section 34 connected to radially outer portion 16 and circumferentially extensions 36a, 36b extending circumferentially away from base section 34 in opposite directions to define outermost circumferential edges 38a, 38b of radially inner portion 18. Radially inner portion 18 of each segment 12 includes a respective segment connector formed by a plurality of hole 40a, 40b, 40c formed between circumferential edges 38a, 38b. In this embodiment, hole 40a is formed in circumferential extension 36a, hole 40b is formed in base section 34 and hole 40c is formed in circumferential extension 36b.

After subassembly 10 is formed, it is connected to cover plate 20 via an extender in the form of an extension ring 42. More specifically, connectors 44 are passed through at least two of holes 40a, 40b, 40c to connect radially inner portion 18 to extension ring 42. In the embodiment shown in FIG. 1a, connectors 44 are passed through holes 40a, 40c, but in another embodiment, connector 44 may also be passed through holes 40b. In this embodiment, connectors 44 are extruded rivets that are extruded from extension ring 42 through holes 40a, 40c. More specifically, extension ring 42 is riveted to segments 12 by extruding extension ring 42 with such a force that each rivet 44 is formed as an extruded rivet, installing the rivet into respective holes 40a, 40c of segments 12, and expanding the rivet to form a head 46. In other embodiments, conventional rivets may be used in place of extruded rivets.

Figure 2:
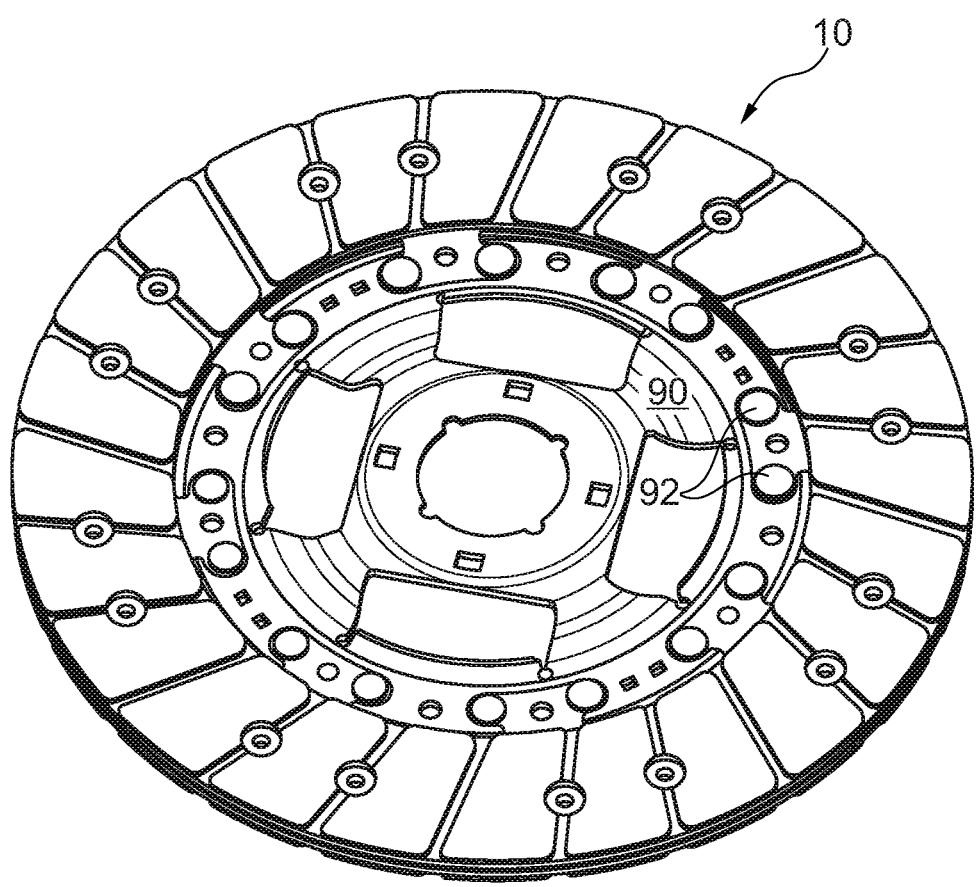
FIG. 2 schematically shows a perspective view of the clutch subassembly shown in FIG. 1a fixed directly to a cover plate having a greater diameter than the cover plate shown in FIG. 1c, without using an extension ring.

An inner radial edge 48 of extension ring 42 is positioned radially inside of an inner radial edge 50 of each of segments 12. In other words, an inner circumferential surface 52 of extension ring 42 is closer than inner radial edges 50 of segments 12 to a center axis 54 about which subassembly 10 is designed to rotate. Extension ring 42 is further fixed to an outer radial end of cover plate 20 via a plurality of connectors 56, which in this embodiment are conventional rivets, passing through holes 57 formed in extension ring 42. Radially inside of connectors 56, cover plate 20 includes a plurality of circumferentially extending slots 58 formed therein for receiving springs 60 (FIG. 2). The use of extenders, for example, extension rings of different inner diameters or being configured to receive connectors at different radial locations, allows subassembly 10 to connected to cover plates of various designs and sizes, without changing the size or design of subassembly.

Damper assembly 22, in addition to cover plate 20, also includes a second cover plate 21, which is fixed to and spaced from cover plate 20 by a plurality of fasteners 23. Cover plates 20, 21 support a plurality of circumferentially spaced springs 25 axially therebetween. Damper assembly 22 also includes a drive hub 27, which is coupled to cover plates 20, 21 by a drive flange 29 (FIG. 1b). In operation, cover plate 20 receives torque from clutch subassembly 10 via extension ring 42, cover plates 20, 21 in turn transfer torque to drive flange 29 via springs 25.

FIG. 2 schematically shows a perspective view of clutch subassembly 10 fixed directed to a cover plate 90 having a greater diameter than cover plate 20, without using extension ring 42. As shown, connectors 92, which in this embodiment are conventional rivets, extend through holes 40a, 40c (FIG. 1c) in segments 12 to fix clutch subassembly 10 to cover plate 90. Accordingly, a plurality of clutch subassemblies 10 may be formed, with some of the subassemblies 10 being connected to smaller diameter cover plates 20 via extension rings 42 and others of the subassemblies being directly connected to larger diameter cover plates 90. In other words, a set of clutch subassemblies 10 of the exact same size and design may be manufactured and a first subset of the set of clutch assemblies may be fixed to cover plates 20 via extension rings 42 and a second subset of the set of clutch assemblies may be fixed to cover plates 90, which have a greater diameter than cover plates 20, directly, without the use of extensions rings.

Figure 3B:
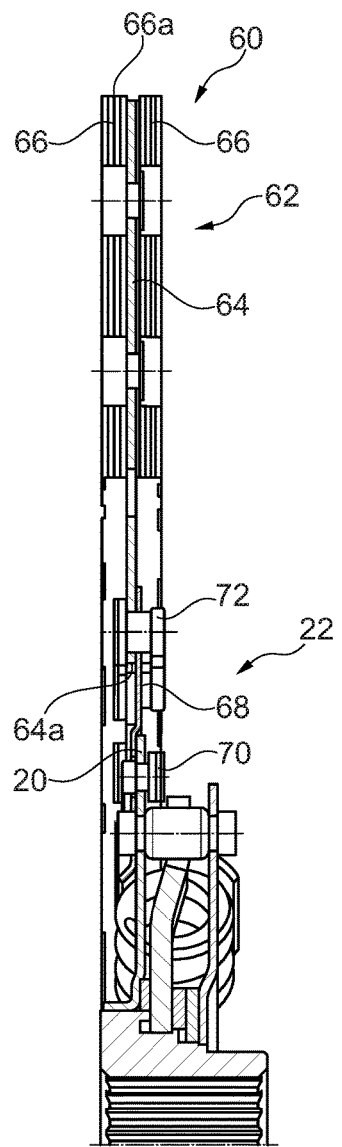
Figure 3A:
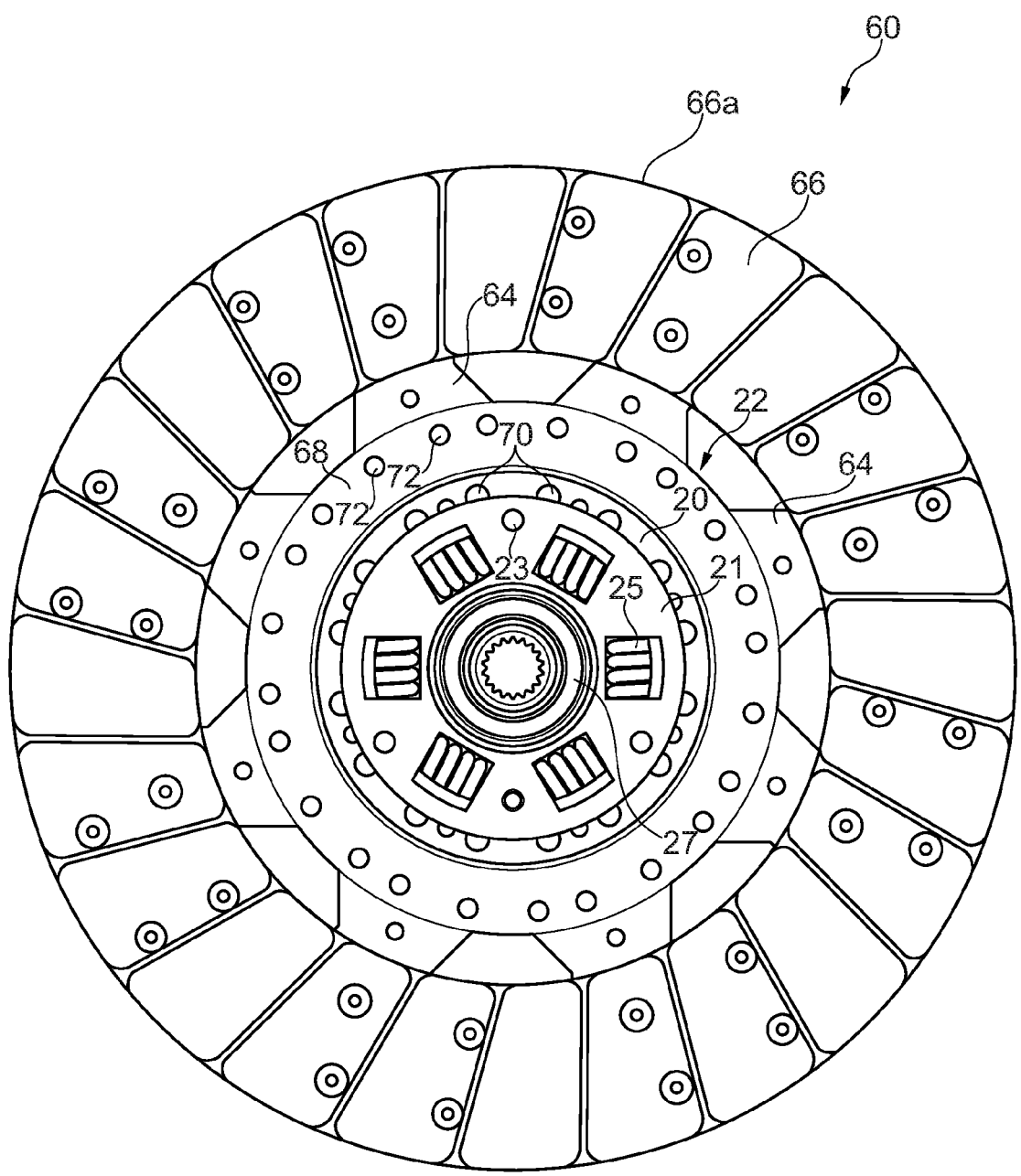
FIG. 3a shows a perspective view of a drive assembly in accordance with another embodiment of the present invention.

FIG. 3a shows a perspective view of a drive assembly 60 including a clutch subassembly 62 fixed to damper assembly cover plate 20, which is also shown in FIGS. 1a, 1b, of a damper assembly 22 in accordance with an embodiment of the present invention. FIG. 3b shows a cross-sectional side view of drive assembly 60. Clutch subassembly 62 includes a plurality of support segments 64 supporting two clutch facings 66, one on a first axial surface thereof and one on a second axial surface thereof opposite the first axial surface, such that segments 64 are each axially sandwiched between the facings 66. In comparison with clutch assembly 10 shown in FIGS. 1a, 1b, clutch subassembly 62 is formed in the same manner as subassembly 10 except that clutch subassembly 62 has a larger outermost diameter, as defined by outer circumferential surfaces 66a of facings 66, than clutch subassembly 10 and a larger innermost diameter, as defined by radially inner edges 64a of support segments 64, than clutch subassembly 10. Clutch subassembly 62 is fixed to cover plate 20 of damper assembly 22 via an extender in the form of an extension ring 68. Extension ring 68 is fixed to cover plate 20 by fasteners 70 and is fixed to segments 64 by fasteners 72. Because clutch subassembly 62 has a larger innermost diameter than clutch subassembly 10 shown in FIGS. 1a, 1b, extension ring 68 is radially thicker than extension ring 42 shown in FIGS. 1a, 1b. Extension ring 68 has a same inner diameter as extension ring 42, but has a larger outer diameter than extension ring 42.

By comparing FIG. 1a with FIGS. 3a, 3b, it is shown that a method of forming a plurality of drive assemblies in accordance with one embodiment of the present invention may include providing a set of cover plates 20 of a same design and providing a first set of first subassemblies 10 having a first innermost diameter and a second set of subassemblies 62 having a second inner most diameter different from the first innermost diameter. Each of the subassemblies 20, 60 including at least one respective clutch facing 14, 66 and at least one support segment 12, 64 supporting the at least one clutch facing 14, 66. Each of the subassemblies 10 may then be fixed to a respective one of the cover plates 20 via a respective extension ring 42 and each of the subassemblies 10 may then be fixed to a respective one of the cover plates 20 via a respective extension ring 68.

Figure 4:
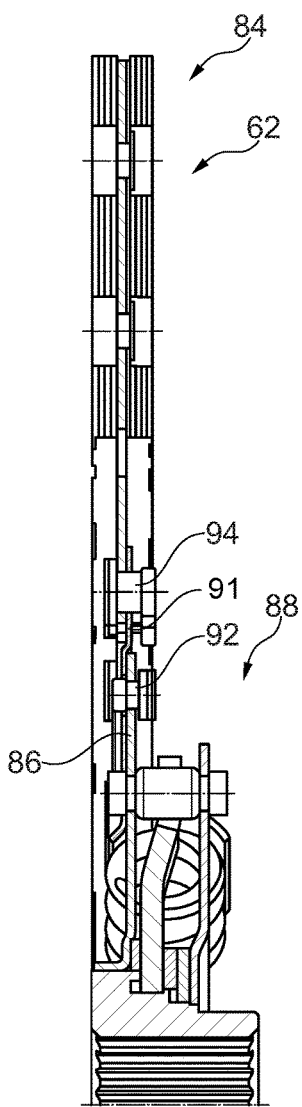
FIG. 4 shows a cross-sectional side view of a drive assembly in accordance with another embodiment of the present invention.

FIG. 4 shows a cross-sectional side view of a drive assembly 84 including clutch subassembly 62 fixed to a damper assembly cover plate 86 of a damper assembly 88 in accordance with an embodiment of the present invention. Drive assembly 84 is configured in the same manner as drive assembly 60, except that damper assembly 88 is of a different design that damper assembly 22 because cover plate 86 has a larger outer diameter than cover plate 20 shown in FIGS. 3a, 3b. Clutch subassembly 62 is fixed to cover plate 86 via an extender in the form of an extension ring 91. Extension ring 91 is fixed to cover plate 86 by fasteners 92 and is fixed to segments 64 by fasteners 94. Because cover plate 86 has a larger innermost diameter than cover plate 20, extension ring 91 is radially thinner than extension ring 68. Extension ring 91 has a same outer diameter as extension ring 68, but has a larger inner diameter than extension ring 68.

By comparing FIG. 4 with FIGS. 3a, 3b, it is shown that a method of forming a plurality of drive assemblies in accordance with one embodiment of the present invention may include providing a set of clutch subassembly 62 of a same design and providing a first set of first cover plates 20 having a first outer diameter and a second set of cover plates 86 having a second outer diameter different from the first outer diameter. Each of the cover plates 20 may then be fixed to a respective one of the subassemblies 62 via a respective extension ring 68 and each of the cover plates 86 may then be fixed to a respective one of the subassemblies 68 via a respective extension ring 91.

Figure 5:
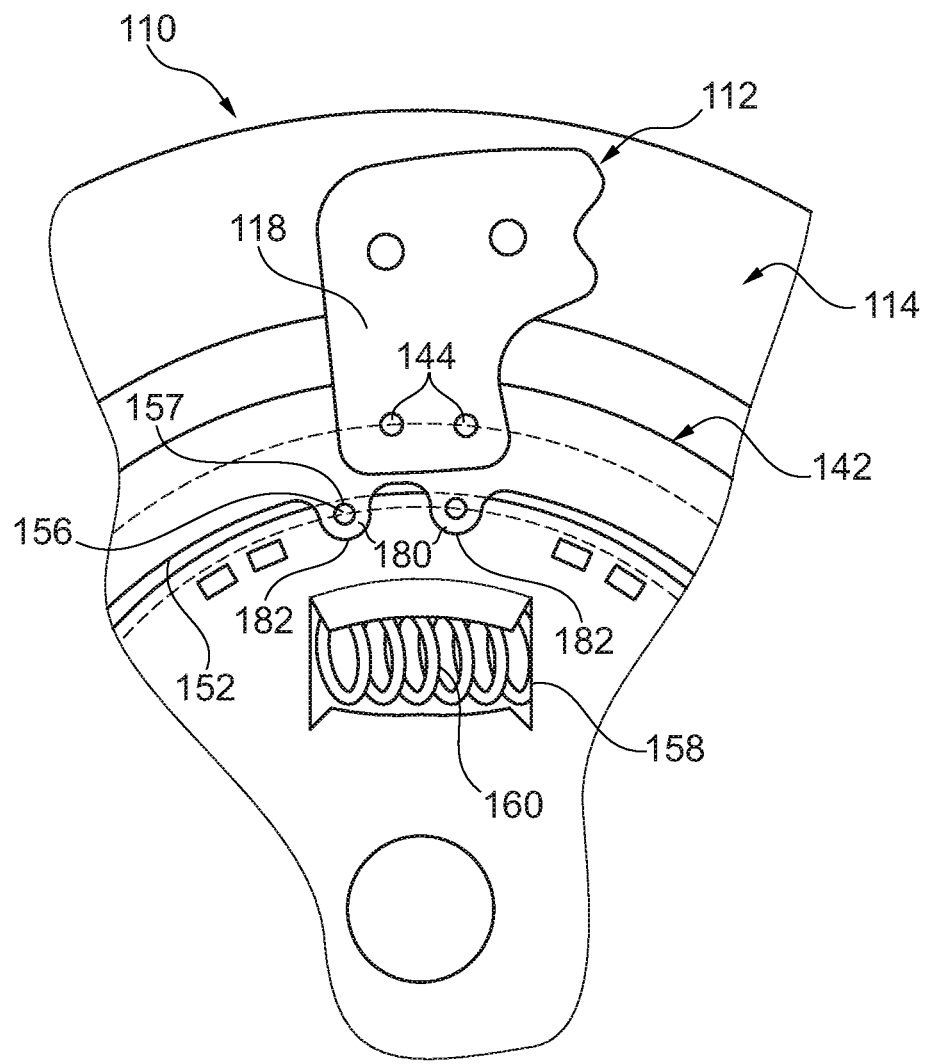
FIG. 5 shows a plan view of a portion of a clutch subassembly in accordance with another embodiment of the present invention.

FIG. 5 schematically shows a plan view of a clutch subassembly 110 fixed to a damper assembly cover plate 120 in accordance with an embodiment of the present invention. Subassembly 110 is formed in substantially the same manner as subassembly 10 and includes a plurality of support segments 112 supporting at least one clutch facing 114. Support segments 112, at radially inner portions 118 thereof, are fixed to an extender in the form of an extension ring 142 by connectors 144 passing through holes in segments 112. In contrast to extension ring 42 in FIG. 1a, extension ring 142 includes radially inner protrusions 180 jutting inward at inner circumferential surface 152 to a radially innermost surface 182 of extension ring 142. Extension ring 142 is fixed to cover plate 120 by connectors 156 passing through holes 157 formed in radially inner protrusions 180 of extension ring 142. Radially inside of connectors 156, cover plate 120 is provided within a plurality of circumferentially extending slots 158 formed therein receiving springs 160. Radially outside of slots 158, cover plate 120 is provided with a plurality of holes for riveting cover plate 120 to a further cover such that springs 160 are held axially between cover plate 120 and the further cover plate.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a motor vehicle clutch comprising:
    a subassembly including at least one clutch facing and at least one support segment supporting the at least one clutch facing, the at least one support segment including an outer radial portion fixed to the at least one clutch facing and an inner radial portion extending radially inward from the outer radial portion;
    an extender connected to the inner radial portion of the at least one support segment;
    a cover plate, the extender connecting the subassembly to the cover plate, the extender being a distinct piece from the cover plate, the extender being fixed to the cover plate by first fasteners; and
    springs supported by the cover plate, an inner radial edge of the extender being radially outside of the springs.

2. The drive assembly as recited in claim 1 wherein the at least one support segment is a plurality of support segments, each of the support segment being riveted to the extender.

3. The drive assembly as recited in claim 2 wherein the inner radial edge of the extender is radially inward further than an inner radial edge of the at least one support segment.

4. The drive assembly as recited in claim 3 wherein the extender is an extension ring having an inner circumference forming the inner radial edge, the inner circumference being radially inward further than the inner radial edges of the support segments.

5. The drive assembly as recited in claim 1 further comprising a second cover plate fixed to the cover plate, the cover plate and the second cover plate supporting the springs axially therebetween.

6. The drive assembly as recited in claim 5 further comprising a drive flange axially between the cover plate and the second cover plate, the cover plate and the second cover plate configured for driving the drive flange via the springs.

7. The drive assembly as recited in claim 1 wherein the at least one clutch facing is two clutch facings, the at least one support segment being sandwiched axially between the two clutch facings.

8. The drive assembly as recited in claim 1 wherein the first fasteners are rivets.

9. The drive assembly as recited in claim 8 wherein the rivets are extruded rivets.

10. The drive assembly as recited in claim 1 wherein the extender is fixed in alignment with the outer circumference of the cover plate by the first fasteners.

11. The drive assembly as recited in claim 1 wherein the first fasteners pass through at least two holes to connect the at least one support segment to the extender.

12. The drive assembly as recited in claim 1 wherein the extender axially contacts the cover plate.

13. The drive assembly as recited in claim 1 wherein an outer circumference of the cover plate is radially outward from the inner radial edge of the extender.

14. A method of forming a drive assembly comprising:
    fixing a plurality of support segments to at least one clutch facing;
    fixing radially inner portions of the support segments to an extender; and
    fixing the extender to a damper cover plate, the extender being a distinct piece from the damper cover plate, the extender being fixed to the cover plate by first fasteners, the damper cover plate supporting springs, an inner radial edge of the extender being radially outside of the springs.

15. The method as recited in claim 14 wherein the fixing the radially inner portion of the support segments to the extender includes riveting the radially inner portion of the support segments to the extender.

16. The method as recited in claim 14 wherein the extender is an extension ring having an inner circumference forming the inner radial edge of the extender, the radially inner portions of the support segments being fixed to the extender such that the inner circumference is radially inward further than inner radial edges of the support segments.

17. A method of forming a plurality of drive assemblies comprising:
    providing a set of subassemblies of a same configuration, each of the subassemblies including at least one clutch facing and at least one support segment supporting the at least one clutch facing, the at least one support segment including an outer radial portion fixed to the at least one clutch facing and an inner radial portion extending radially inward from the outer radial portion;
    fixing each subassembly of a first subset of the subassemblies to one of plurality of first cover plates, each of the subassemblies of the first subset being fixed to the respective first cover plate via a respective extender; and
    fixing each subassembly of a second subset of the subassemblies to one of plurality of second cover plates, the second cover plates having a design different than the first cover plates.

18. The method as recited in claim 17 wherein the each of the subassemblies of the second subset are fixed directly to the respective second cover plate.

19. The method as recited in claim 17 wherein the first cover plates have a first diameter and the second cover plate have a second diameter, the second diameter being greater than the first diameter.

20. The method as recited in claim 17 wherein each of the subassemblies of the second subset are fixed to the respective second cover plate via a respective second extender, the first extenders each having a first inner diameter, the second extenders each having a second inner diameter, the second inner diameter being different than the first inner diameter.

* * * * *